July 18, 1933.  A. LEIB  1,918,850
RADIO DIRECTION FINDER
Filed July 20, 1929  2 Sheets-Sheet 1

INVENTOR
AUGUST LEIB
BY
ATTORNEY

July 18, 1933.  A. LEIB  1,918,850
RADIO DIRECTION FINDER
Filed July 20, 1929   2 Sheets-Sheet 2

Figure 2:
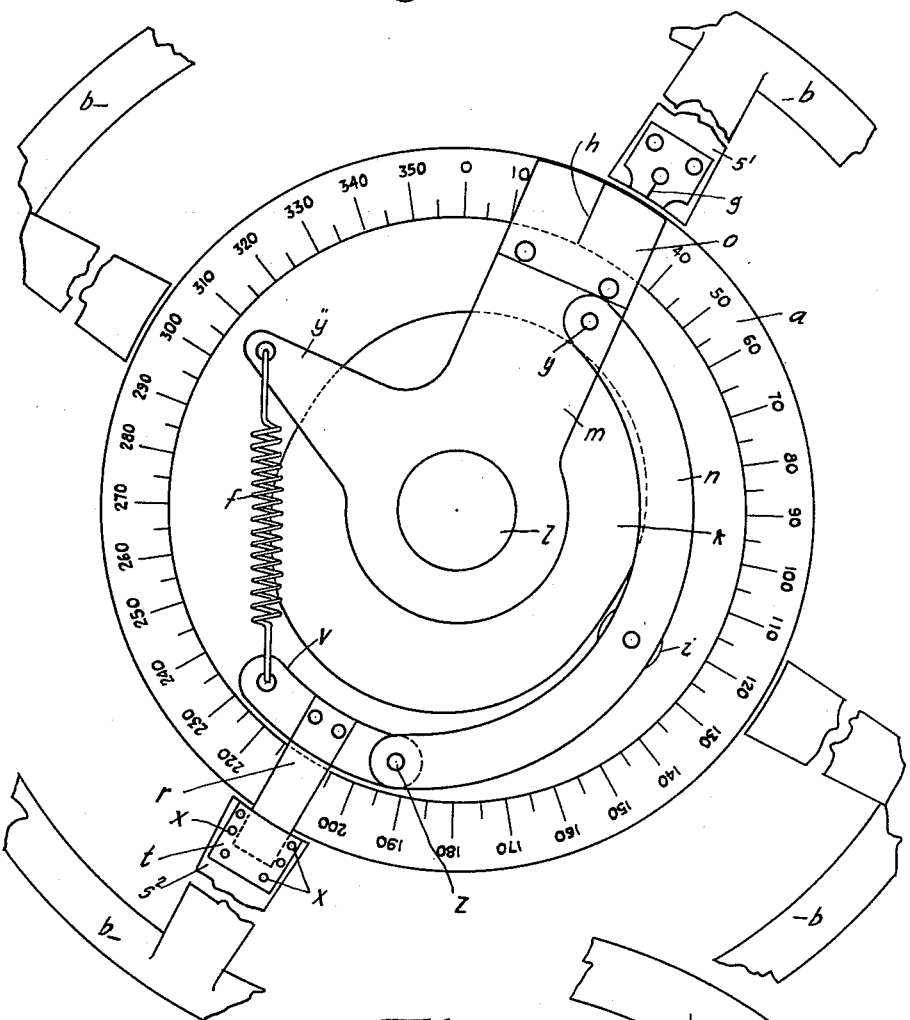
Figure 2:
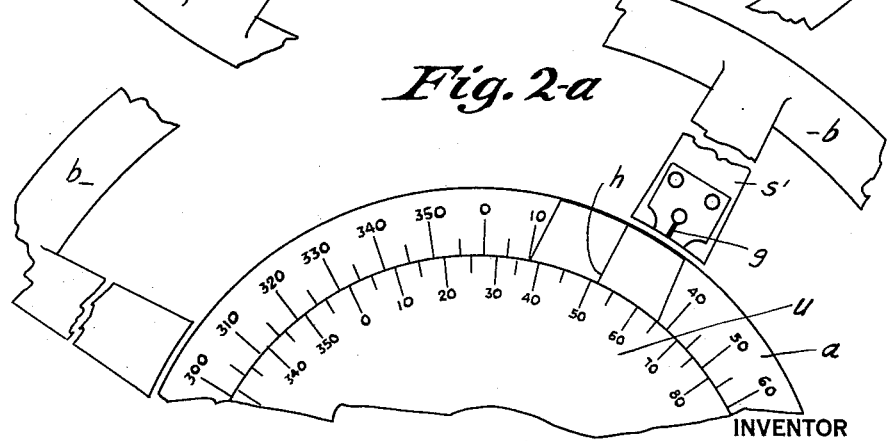

*Fig. 2-a*

INVENTOR
AUGUST LEIB
BY
ATTORNEY

Patented July 18, 1933

1,918,850

UNITED STATES PATENT OFFICE

AUGUST LEIB, OF BERLIN, GERMANY, ASSIGNOR TO TELEFUNKEN GESELLSCHAFT FÜR DRAHTLOSE TELEGRAPHIE, M. B. H., OF BERLIN, GERMANY, A CORPORATION OF GERMANY

RADIO DIRECTION FINDER

Application filed July 20, 1929, Serial No. 379,608, and in Germany August 6, 1928.

This invention relates to direction finders and in particular to a direction finder in which new and improved means is provided whereby the correct reading i. e. the true pointing position of the signalling station is indicated by the pointer.

It is well known that the angle of the goniometric antenna or the bearing wheel (direction-finding wheel) generally does not give the true bearing, i. e., the direction or location of the radio beacon. Indeed, the influence of the surroundings of the radio direction-finder plays a certain part in so far as metallic objects located in the neighborhood of the goniometric antenna and their re-radiation component tend to turn the plane of the radiations exciting the antenna. According to general practice, experimentally determined tabulations or graphs are employed to ascertain the true bearing angle, and the correction values taken from these tables or curves are computed either positively or negatively to the bearing angles to get the true bearings.

Now, the present invention makes it possible to dispense with tabulations or graphs and corrective calculus in that it discloses ways and means whereby direct reading of the true bearings on the direction-finding disk or dial is feasible.

According to the invention, this is made possible by that the reading index hand guided by the direction-finding wheel along the stationary bearing circle is disposed angularly movable in either direction relative to the direction-finding wheel, and that such shifting or adjustment is effected, by the agency of guide means fixedly arranged on the direction finding disk, in accordance with the correction required in a given case.

Figure 1:
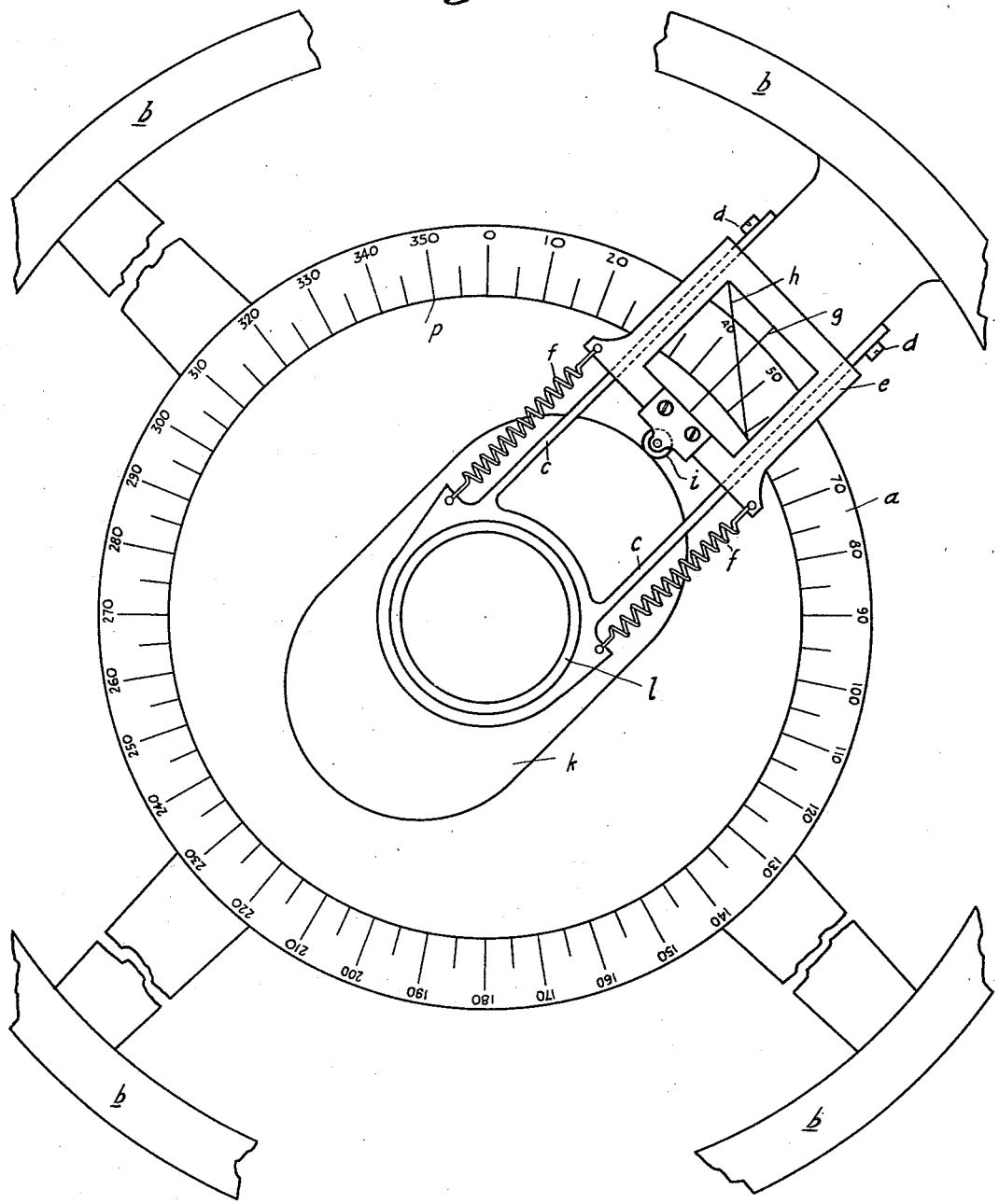

A better understanding of the invention will be had from the specification when read in connection with the drawings, in which, Figures 1 and 2 each show for purposes of illustration a different modification of the invention and Fig. 2a illustrates the arrangement of Fig. 2 with a mobile compass scale.

Referring to the drawings and in particular to Figure 1, a wheel briefly called the bearing wheel $b$ is rotatably mounted about the stationary graduated bearing disk $a$. In case a direction finding outfit mounted on board ship is involved, the graduated bearing circle is mounted stationary in known manner so that the direction of its diameter passing through divisions 0 and 180 degrees coincides with the axis laid through midships. Connected in a fixed manner with the bearing wheel is a frame arm $c$ by that, for instance, it is secured to a spoke by the aid of screws $d$ and is rotatable about the axis or pivot $l$ conjointly with the bearing wheel. The arm $c$ serves as a guide for a radially displaceable slide $e$ which carries an index hand $h$ serving for taking readings. The said index hand is suitably a linear structure, say, a stretched and tensioned thread, or thin line or the like traced upon a lamella made from transparent material (celluloid, mica or the like) supported by said slide. The said index hand $h$ serves for reading the true angles or bearings.

In addition it is advisable to dispose another similarly constructed index hand $g$ in radial direction upon the said slide, said second index serving for reading bearing wheel angles i. e. the apparent pointing position of the radio compass. For radially displacing the slide $e$ is used a roller $i$ which is supported in an extension of said slide, and which slides along a guiding curve or cam $k$ arranged on the stationary bearing circle $a$. The cam $k$ is representative of the deviation of the index $g$ from the true position of the signal source. To press the said roller against the cam $k$ there are provided two springs $ff$, one end of the latter being secured on the slide $e$, and the other end at suitable projections or extensions of the arm $c$. The cam $k$ is so shaped that the point of intersection between index hand $h$ and the reading edge $p$ of the fixed bearing circle results in the true bearing angle. For instance, if at the point in question, the correction is of zero value, then the index hand $h$ cuts the index $g$ just above the reading edge, with the result that value $w$ of the bearing wheel angle and value $q$ of the true bearing coincide. If the correction to be introduced in the reading of the bearing is of a positive value, then the slide, at the bearing wheel position in question, is radially removed from the axis $l$ so that the point of intersection of $h$ and $g$ comes to fall outside the bearing circle, while the point of intersection of $h$ and $p$ is located on the right-hand side of the intersection of index hand $g$ and $p$. In the presence of negative corrections, on the contrary, the slide approaches the pivot so that the intersection between $h$ and $g$ falls inside the reading circle, and the point of intersection between the latter and $h$ lies on the left-hand side of its intersection with $g$.

Another embodiment is shown in Fig. 2. In this instance, the indicator line $g$ for reading the direction-finder wheel angles is disposed on a bearing-wheel spoke $s1$, and indicator or index line $h$ for reading the true bearing angles on a crank $m$ rotatable about the pivot $l$ is arranged also in radial sense. Also in this case the indicator line $h$ most preferably is provided upon a transparent lamella $o$ secured at the end of the crank $m$, the latter being driven or entrained by the bearing wheel $b$ by the agency of a lever $n$. The latter is associated at one end with crank $m$ by means of a hinge or link $y$, and at the other end with the bearing wheel $b$ by means of a link $z$. In the embodiment here illustrated the hinged connection $z$ is arranged on a plate $v$ which is supported by a transparent lamella $r$ attached to the bearing wheel spoke $s2$ by means of a pressure or clamp plate $t$ and screws $x$. A spring $f$ which is tensioned between an extension $y$ of crank $m$ and the plate $v$ causes the roller $i$ supported approximately in the middle of the lever $n$ being pressed against the guide cam $k$ which in the preceding embodiment was disposed above the bearing disk $a$ and was fixedly connected therewith.

The lever transmission means as hereinbefore described causes the reading index $h$ to lead in relation to index $g$ as the bearing wheel $b$ is turned, owing to the proper choice of the shape of the cam $k$, whenever the correction has a positive value, and to lag behind $g$ whenever the correction is negative.

In arrangements as hereinbefore described it is recommendable to combine the bearing circle with a mobile compass needle, most preferably in such a manner that the latter is arranged co-axial in relation to the former slightly above the plane of index $h$. It is then possible to read with index $h$ also the angle of the incoming beacon radiation in reference to the meridian.

In the case of an arrangement as shown in Fig. 1, the reading scale of the bearing circle, of course, should then be arranged in the immediate neighborhood of the compass graduation on the outer edge of the mobile compass circle, instead of on its outer periphery, in order that the two reading circles may intersect with the obliquely positioned index $h$ at practically the same point.

In the arrangement shown in Fig. 2, this is not absolutely necessary, however, inasmuch as the index $h$ is here not orientated radially. Indeed, the bearing scale could here be provided also at the outer edge of the bearing circle.

Fig. 2a illustrates the described connection of the arrangement Fig. 2 with the mobile compass circle $u$.

What is absolutely necessary is that the form of the guide cam $k$ should result exactly in a shift of index $h$ corresponding to the desired corrections. It will be understood that there is a definite correction curve (as found by taking readings on board a given vessel) for each type of vessel and for a given equipment mounted on shipboard, though for several vessels of the same type and with similar equipment, the same cam $k$ could be used. However, it is preferable to adapt the shape of the cam $k$ to the particular ship on which it is to be used or generally to the particular properties of the direction finding outfit and its surroundings. A disk of this sort may be made with great exactness for each individual case. In the case of an arrangement as shown in Fig. 2 it is sufficient to replace the roller $i$ by a convenient marking device, and to dispose at the place where later the disk or cam $k$ is to be arranged, a plate or slab from which the disk or cam is to be cut later. If, then, in the presence of different angles of the bearing wheel the index $h$ with its crank $m$ is withdrawn off in the position corresponding to the reading of the true bearing angle, and if the marking device located in the place of the roller $i$ is pressed down, by applying pressure from above, upon the plate to be worked or shaped, an outline will be produced or scratched upon the latter by the sharp contour of the marking device, and several such marking contours constituting an envelope result in the shape of the requisite guide cam $k$ which is thereupon cut out of the plate.

I claim:

1. An arrangement for the direct reading of true bearing angles in radio direction finders comprising, a stationary bearing scale, a bearing wheel, a guide-way fixed to said wheel and extending radially thereof, a reading index slidably supported by said guide-way and adapted to be guided by the bearing wheel along the stationary bearing wheel, and means for displacing the reading index radially relative to the bearing wheel an amount representative of the correction required comprising a guide member fixed to said bearing scale.

2. An arrangement as claimed in claim 1 in which the reading index is mounted on a spring biased slide on said guide-way and in which the reading index comprises a thin line traced upon a transparent material, and in which the means fixed on the bearing wheel is a cam which restrains the movement of said slide.

3. An arrangement as claimed in claim 1 in which the reading index is mounted on a spring biased slide in said guide-way and in which the reading index comprises a line traced on a transparent material in a direction oblique to the axis of said guide-way, and in which the guide means comprises a correction cam which restrains the movement of the slide.

4. An arrangement as claimed in claim 1 in which the reading index is mounted on a spring biased radially displaceable slide on said guide-way and in which said slide is provided with a roller bearing on said guide means, and in which said guide means is in the form of a cam, said slide being biased to maintain said roller against said cam.

5. Compensating means to be used with a radio compass including an aerial system inherently subject to pointing errors, a rotatable operating hand wheel adapted to rotate simultaneously with said aerial system, a cam shaped member having a surface representative of the pointing errors inherently present in said compass, an indicating arm member fixed for simultaneous and uniform rotation with said rotatable operating hand wheel but radially movable with respect thereto, an indicator fixed to said indicator arm member and tensioned means for causing said indicator to bear on said cam surface, whereby movement representative of said surface is imparted to said indicator.

6. In radio directional apparatus comprising a rotatable directional antenna system inherently subject to pointing errors, a radial line, an indicator associated with said system for indicating the apparent bearing of signal currents therein, said radial indicator comprising a frame arm fixed to said antenna system, a sliding member mounted on said frame arm containing said radial line indicator, a second line indicator mounted on said frame arm and crossing said radial line obliquely to indicate the true bearings of the signal currents in said system, said indicators being relatively fixed, and a reference scale adjacent said indicators.

7. A true pointing direction finder including a radio compass inherently subject to pointing errors including an operating member rotated simultaneously with said radio compass, an indicator having two index lines the radial line position of which is relative to the axis of rotation of said operating member indicates the true pointing position and whose angular line position represents the apparent pointing position of said compass, and means for imparting a radial movement to said indicator during rotation thereof including a cam the surface of which is representative of the errors inherent in said compass.

AUGUST LEIB.